(12) United States Patent
Price et al.

(10) Patent No.: US 7,236,384 B2
(45) Date of Patent: *Jun. 26, 2007

(54) FREQUENCY FEEDFORWARD FOR CONSTANT LIGHT OUTPUT IN BACKLIGHT INVERTERS

(75) Inventors: Erin L. Price, Pflugerville, TX (US); Brent A. McDonald, Round Rock, TX (US); Chris Young, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/325,120

(22) Filed: Jan. 4, 2006

(65) Prior Publication Data

US 2006/0114703 A1   Jun. 1, 2006

Related U.S. Application Data

(63) Continuation of application No. 10/777,399, filed on Feb. 12, 2004, now Pat. No. 7,016,208.

(51) Int. Cl.
*H02M 7/5387* (2006.01)

(52) U.S. Cl. ............................. 363/132; 363/41
(58) Field of Classification Search .............. 363/17, 363/26, 40, 41, 98, 132; 323/235, 283; 315/308
See application file for complete search history.

(56) References Cited

U.S. PATENT DOCUMENTS

| | | | |
|---|---|---|---|
| 5,004,969 A * | 4/1991 | Schanin | 323/235 |
| 5,420,779 A | 5/1995 | Payne | |
| 5,430,641 A | 7/1995 | Kates | |
| 6,108,215 A | 8/2000 | Kates et al. | |
| 6,130,509 A | 10/2000 | Kates et al. | |
| 6,903,949 B2 * | 6/2005 | Ribarich | 363/98 |

\* cited by examiner

*Primary Examiner*—Jessica Han
(74) *Attorney, Agent, or Firm*—Haynes and Boone, LLP

(57) ABSTRACT

In a method and system for an improved inverter providing power to a load, the inverter receives a direct current (DC) input. A plurality of switches included in the inverter are controlled by a plurality of control signals to generate an alternating current (AC) output in response to the DC input. A zero crossing of the AC output current provided by the plurality of switches is detected, and the controlling of the plurality of switches is delayed in response to the zero crossing. The amount of delay is adjusted responsive to a change in the DC input to effectively maintain a constant switching frequency of the inverter. The delayed AC output current of the plurality of switches is filtered to provide power to the load.

9 Claims, 4 Drawing Sheets

FREQUENCY FEEDFORWARD FOR CONSTANT LIGHT OUTPUT IN BACKLIGHT INVERTERS

CROSS-REFERENCE TO RELATED APPLICATIONS

This application claims priority to and is a continuation of co-owned U.S. patent application Ser. No. 10/777,399, filed Feb. 12, 2004 now U.S. Pat. No. 7,016,208 by Erin L. Price, Brent A. McDonald and Chris Young and, entitled FREQUENCY FEEDFOWARD FOR CONSTANT LIGHT OUTPUT IN BACKLIGHT INVERTERS, which is incorporated herein by reference in its entirety.

BACKGROUND

The present disclosure relates generally to the field of power supplies for information handling systems, and more particularly to techniques for efficiently providing power to drive a discharge lamp, such as a cold cathode fluorescent lamp (CCFL).

As the value and use of information continues to increase, individuals and businesses seek additional ways to acquire, process and store information. One option available to users is information handling systems. An information handling system ('IHS') generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Liquid crystal display (LCD) panel based display devices have been commonly utilized in many IHS systems due to their compact size, and low power consumption. Although there are different types of backlights (e.g., light sources including a discharge lamp), which are currently used for backlighting the latest LCD panels, the CCFL (also known as cold cathode fluorescent tube (CCFT)) is most commonly used. Circuits for supplying power to CCFL's generally require a controllable alternating current (AC) power supply and a feedback loop to accurately monitor the current in the lamp in order to maintain operating stability of the circuit and to have an ability to vary the lamp brightness. Such circuits typically generate a high voltage to initially turn on the CCFL and then lower the voltage when current begins to flow through the lamp. For example, Monolithic Power Systems, Inc., located at 983 University Ave, Building D, Los Gatos, Calif. 95032, USA, provides a MP1015 power circuit chip for driving the CCFL.

Such circuits also typically include an inverter circuit to convert a direct current (DC) voltage received as an input to a regulated AC voltage generated as an output. Inverter circuits typically include a controller component, such as a pulse width modulator (PWM) based controller. Various well-known inverter circuit configurations or "topologies" include a Royer converter, full-bridge or half-bridge inverters.

The CCFL power consumption may account for a significant portion (e.g., up to 50% in some cases) of the IHS system power requirement, especially for portable systems. Therefore, there is a considerable amount of interest to achieve advantages in extending battery life and reducing re-charge frequency by improving the efficiency of power supplies configured to provide power to the CCFL.

In traditional inverter based power circuits, changes in input voltage causes a decrease in power conversion efficiency. For example, when an adapter is unplugged/plugged into a portable IHS system such as a notebook computer, the voltage to the LCD backlight inverter varies from AC adapter voltage (approximately between 18V and 22V) to the battery voltage (approximately between 9V and 17V). The varying voltage causes a noticeable change in the LCD brightness level, which is often perceived as a flicker.

Brightness output from the CCFL is a function of operating frequency. FIG. 1A illustrates a graphical relationship between LCD brightness (shown on Y-axis) versus frequency (shown on X-axis) measurements for a commercially available CCFL. Curves 110, 120 and 130 are shown for lamp currents of 6 mA, 5 mA and 4 mA.

Power conversion efficiency of an inverter is a function of the input voltage. FIG. 1B illustrates a graphical relationship between a change in efficiency (shown on Y-axis) versus input voltage (shown on X-axis) measurements for a commercially available inverter.

FIG. 1C illustrates a graphical relationship between a change in frequency (shown on Y-axis) versus input voltage (shown on X-axis) measurements for a commercially available inverter. Thus, frequency of the backlight inverter changes as a function of input voltage causing the brightness change and the change in frequency causes a decrease in the inverter efficiency.

Therefore, a need exists for improved efficiency of the power circuits providing power to the CCFL. More specifically, a need exists to develop tools and techniques for improving the efficiency of inverters under changing voltage and frequency conditions. Accordingly, it would be desirable to provide tools and techniques for an improved inverter of an IHS absent the disadvantages found in the prior methods discussed above.

SUMMARY

One embodiment accordingly provides a pulse start component operable to receive a first input indicative of a primary current. The pulse start component generates a first output responsive to a zero crossing of the first input. A pulse duration component is operable to receive a second input indicative of a load current and a third input indicative of a direct current (DC) input voltage. The pulse duration component is operable to generate a second output responsive to the second and third inputs. A time delay component is operable to receive the first output and the DC input voltage. The time delay component introduces a time delay to generate a delayed first output. A logic component is operable to receive the delayed first output and the second output to generate a plurality of control signals. A plurality of switches are operable to convert the DC input to the primary current in response to receiving the plurality of control signals. A filtering component is provided to filter the primary current for generating the load current.

Several advantages are achieved by the method and system according to the illustrative embodiments presented herein. The embodiments advantageously provide for a system and method for an improved inverter, because the inverter includes a variable time delay mechanism to advantageously operate the inverter at a constant switching frequency. The efficiency of the inverter is improved by maintaining the constant switching frequency. In addition, the inverter has the ability to accommodate varying DC input voltages and changing pulse widths.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip), firmware (including application specific integrated circuits and programmable chips) and/or software or a combination thereof, depending on the application requirements.

Changes in DC input voltage causes a change in frequency for the traditional inverter circuits, thereby causing a change in the brightness level of the CCFL. More importantly, the efficiency of traditional inverter circuits providing power to the CCFL decreases as DC input voltage increases. It would be desirable to improve the efficiency of inverters under changing voltage and frequency conditions. The problem of varying backlight operating frequency due to changes in the DC input voltage may be advantageously eliminated by adding a frequency feed-forward term. This technique provides a constant frequency over the DC input voltage range and improves efficiency over the range of DC input voltages.

According to one embodiment, in a method and system for an improved inverter providing power to a load, the inverter receives the DC input. A plurality of switches included in the inverter are controlled by a plurality of control signals to generate the AC output in response to the DC input. A zero crossing of an AC output current provided by the plurality of switches is detected, and the controlling of the plurality of switches is delayed in response to the zero crossing. The amount of delay is adjusted responsive to a change in the DC input to effectively maintain a constant switching frequency of the inverter. The delayed AC output current provided by the plurality of switches is filtered to provide power to the load.

Figure 2:
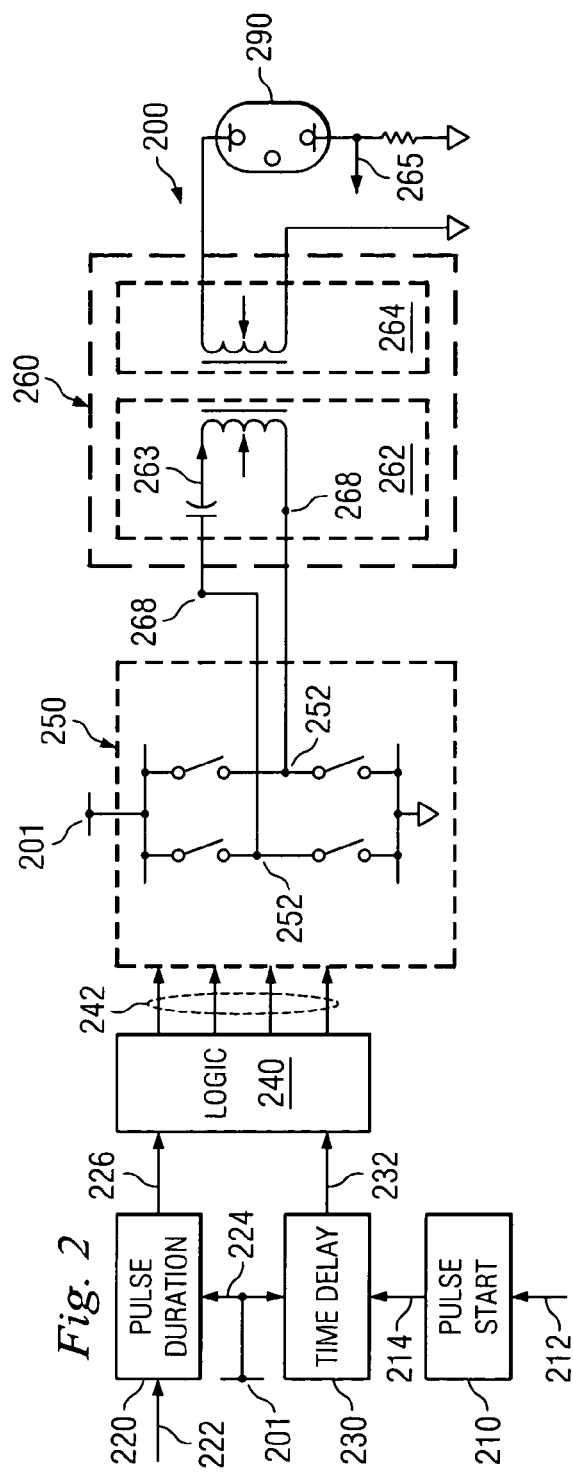
FIG. 2 illustrates an inverter for providing power to a load, according to an embodiment.

FIG. 2 illustrates an improved inverter 200 for providing power to a load 290, according to one embodiment. The inverter 200 includes the following components: a) a pulse start component 210, b) a pulse duration component 220, c) a time delay component 230, d) a logic component 240, e) a plurality of switches 250, and f) a filter component 260.

In one embodiment, the filter component 260 includes a transformer device having a primary section 262 electromagnetically coupled to a secondary section 264. The primary section 262 is electrically coupled to the plurality of the switches 250. A primary current 263 flows through the primary section 262 and a primary voltage (not shown) is measured across a pair of terminals 268 of the primary section 262. The secondary section 264 is electrically coupled to the load 290. A secondary current 265, which is also the load current, flows through the secondary section 264. In one embodiment, the load 290 is the CCFL.

The pulse start component 210 is operable to receive a first input 212 indicative of the primary current 263. The pulse start component 210 generates a first output 214 responsive to a zero crossing of the primary current 263. That is, the first output 214 is generated when a value of the first input 212 is equal to zero.

The pulse duration component 220 is operable to receive a second input 222 indicative of the secondary current 265, which is also the load current, and a third input 224 indicative of a direct current (DC) input voltage 201. The DC input voltage 201 may also be referred to as a DC bus. The DC input voltage 201 may vary between a battery voltage (approximately between 9V and 17V) and an AC adapter voltage (approximately between 18V and 22V). The pulse duration component 220 generates a second output 226 responsive to the second 222 and third 224 inputs.

The time delay component 230 is placed between the pulse start component 210 and the logic component 240 to advantageously impose a time delay on the first output 214. The time delay component 230 receives the first output 214 and the third input 224 (indicative of the DC input voltage 201), introduces a time delay to generate a delayed first output 232. In one embodiment, a variable value for the time delay is selectable to advantageously maintain a constant switching frequency of the inverter 200, thereby improving the efficiency of the inverter 200. In one embodiment, a particular value of the time delay is selectable by the time delay component 230 to maintain a constant switching frequency of 68 kHz, in response to a change in the value of the DC input voltage 201. The range for selecting a particular value for the constant switching frequency may generally vary from 40 to 160 kHz. Additional details of the timing aspects of the time delay are described in FIGS. 3A and 3B. Further detail of the structure of the time delay component 230 and the selection of a particular value for the time delay are described in FIGS. 4A and 4B.

The logic component 240 is operable to receive the delayed first output 232 and the second output 226 to generate a plurality of control signals 242 for controlling the plurality of switches 250. The plurality of switches 250 control the flow of current from the DC input voltage 201 source to the filter component 260. The plurality of switches 250 thus control the magnitude and direction of the primary current 263 and hence the secondary current 265 and the current flowing through the load 290.

In one embodiment, each control signal included in the plurality of control signals 242 controls a corresponding switch included in the plurality of switches 250. Each control signal controls the corresponding control switch by placing it in an ON or OFF state, and by controlling a time period the switch remains in the ON or OFF state. In one embodiment, each of the plurality of switches 250 is a MOSFET device.

The plurality of switches 250 may be configured in a variety of configurations such as half-bridge and full-bridge. In the depicted embodiment, the plurality of switches is configured as a full-bridge circuit that includes four switches. In this embodiment, the plurality of control signals 242 include four control signals operable to control the corresponding four switches. The plurality of switches 250 are electrically coupled to the primary section 262 by the pair of terminals 268. An AC output measured across a pair of terminals 252 of the plurality of switches 250 has a constant switching frequency caused by imposing the time delay.

Figure 3A:
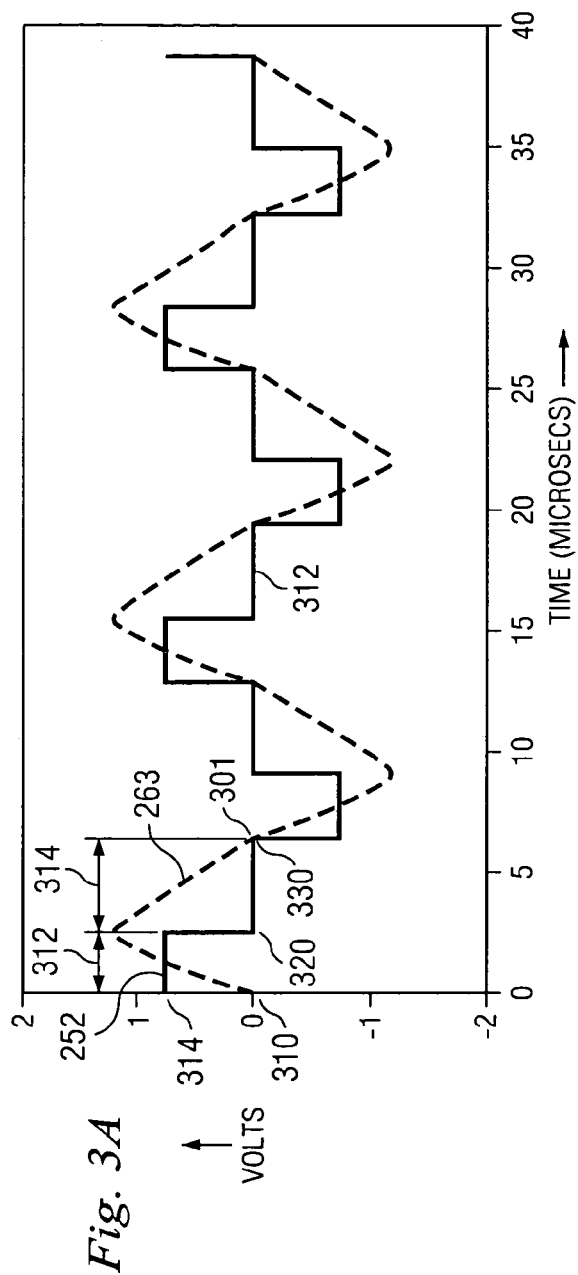
FIG. 3A illustrates waveforms associated with an inverter having no time delay.

FIG. 3A illustrates waveforms associated with the inverter 200 having no time delay. In this illustration, the time delay is not present or has a value of zero. The first output 214 (not shown) is the same as the delayed first output 232 (not shown). Also, the primary voltage across the pair of terminals 268 substantially tracks the AC output 252 of the plurality of switches 250. Frequency of the inverter 200 is determined indirectly by pulse width of voltage waveform of the output across terminals 252. The polarity of the pulse may be positive, negative or equal to zero. At low input voltages, the pulse width is long compared to the high input voltages, when the pulse width is short. That is, in order to deliver the same power to the load 290 the duty cycle decreases. In the illustration, the pulse starts when the inverter circuit 200 detects a zero crossing 301 of the primary current 263 because there is no time delay component 230 or the time delay is zero. If the pulse varies in width, due to a changing value of the DC input voltage 201, the subsequent zero crossing for the next pulse varies as well, thereby causing a variable switching frequency.

At time $t=t_0$ 310, the output across the terminals 252 increases from an initial value $V_0$ 312 (e.g., 0 volts) to an increased value of $V_2$ 314 volts. When a selective number of the plurality of switches 250 are turned ON in response to a change in the output across the terminals 252, the primary current 263 ramps up from an initial value $I_0$ (e.g., 0 amperes) to a maximum value of $I_2$ due to more voltage being available to change the current in the transformer leakage inductance, because $V=L*(di/dt)$. The time duration for which the primary current 263 continues to increase is a $t_{ON}$ 312 period of the duty cycle. At $t=t_1$ 320, the output across the terminals 252 decreases to $V_0$. The primary current 263 decays to $I_0$. The time duration for which the primary current 263 continues to decrease is a $t_{OFF}$ 314 period of the duty cycle. At $t=t_2$ 330, a zero crossing of the primary current 263 is detected by the pulse start component 210. In response to the zero crossing, the plurality of the switches 250 are placed in an ON or OFF state and the cycle is repeated. In this illustration, the pulse width (e.g., $t_{ON}$ 312+$t_{OFF}$ 314) varies as the DC input voltage 201 varies. Thus, it would be desirable to provide a constant switching frequency to improve the efficiency of the inverter 200.

Figure 1A:
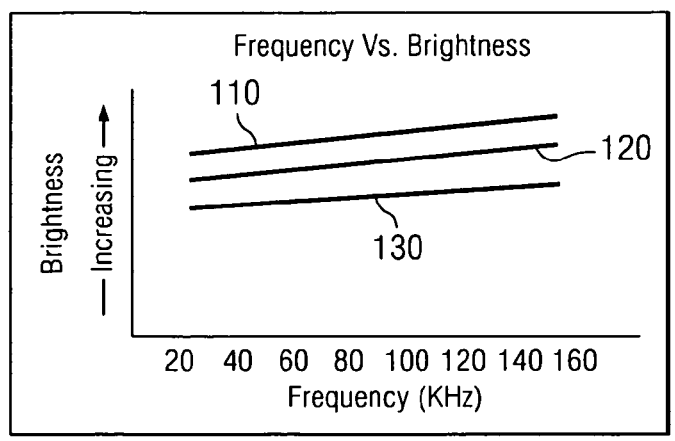
FIG. 1A described hereinabove, illustrates a graphical relationship between LCD brightness versus frequency measurements for a commercially available CCFL, according to prior art.
Figure 1B:
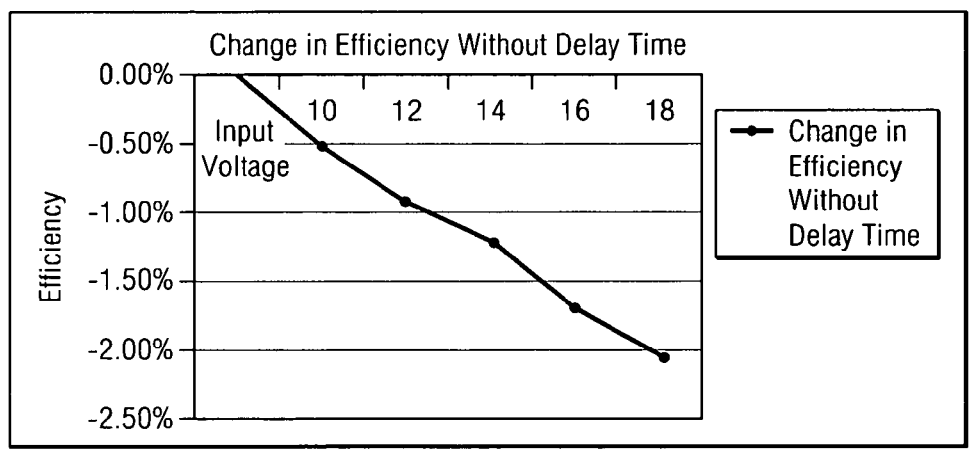
FIG. 1B described hereinabove, illustrates a graphical relationship between a change in efficiency versus input voltage measurements for a commercially available inverter, according to prior art.
Figure 1C:
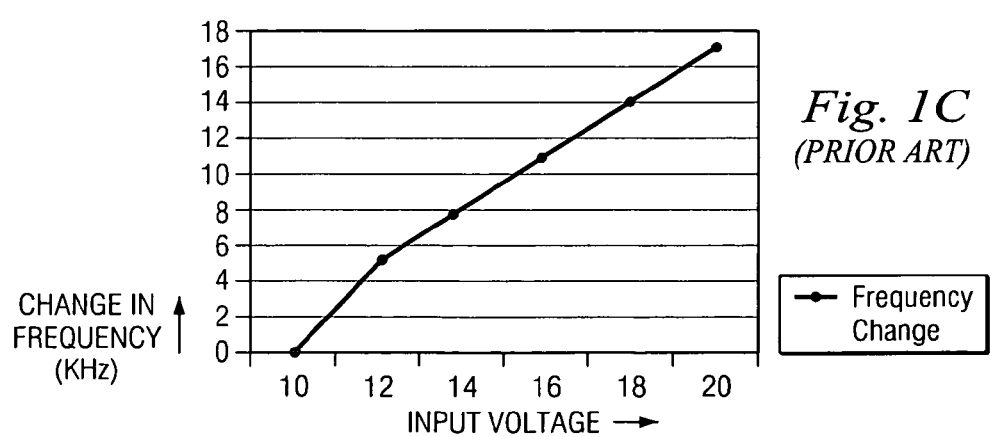
FIG. 1C described hereinabove, illustrates a graphical relationship between a change in frequency versus input voltage measurements for a commercially available inverter, according to prior art.
Figure 3B:
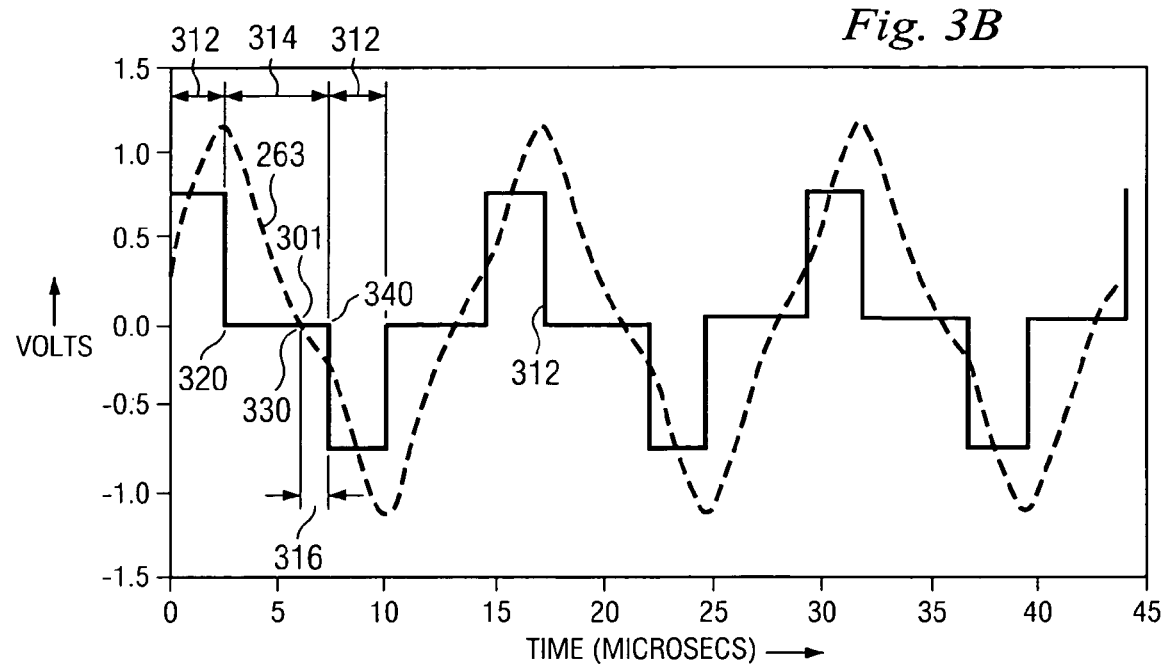
FIG. 3B illustrates waveforms associated with an inverter having a time delay, according to an embodiment.

FIG. 3B illustrates waveforms associated with the inverter 200 having a time delay, according to an embodiment. In this embodiment, the time delay component 230 (not shown) introduces (or imposes) a time delay $t_d$ 316 in changing the state of a switch included the plurality of switches 250 (not shown) in response to the zero crossing 301. That is, the time delay $t_d$ 316 is imposed from the zero crossing time $t_2$ 330 to a change in the state of the switch time $t_3$ 340. As described earlier, an amount or a value of the time delay td 316 imposed varies with the DC input voltage 201. The introduction of the variable time delay $t_d$ 316 causes a subsequent zero crossing of the first input 212 to remain fixed relative to a previous zero crossing thereby advantageously generating a constant switching frequency, e.g., 68 KHz. Operating the inverter 200 at the constant switching frequency advantageously improves the efficiency, as described in FIGS. 1A and 1B. The time delay $t_d$ 316 causes an adjustment of the time period $t_{OFF}$ 314 to maintain the constant switching frequency.

Figure 4A:
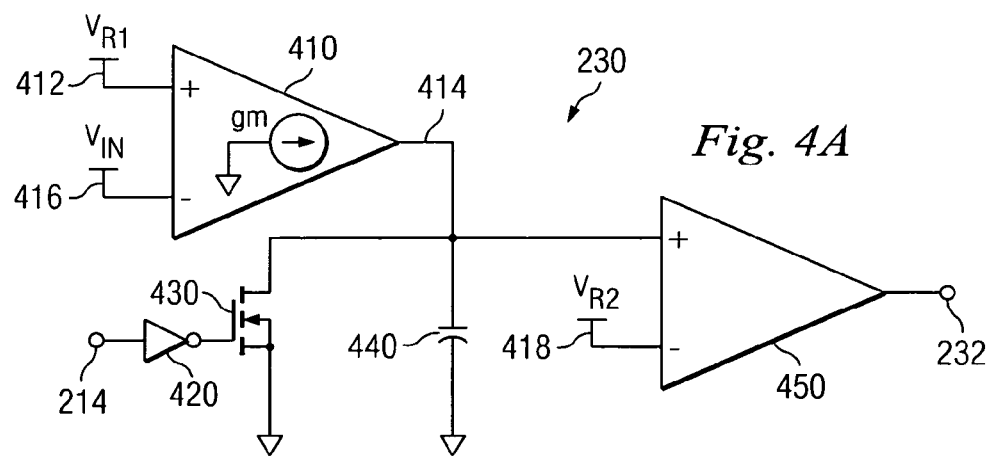
FIG. 4A illustrates detail of a time delay component 230 of FIG. 2, according to one embodiment.

FIG. 4A illustrates detail of the structure of the time delay component 230 of FIG. 2, according to one embodiment. In the depicted embodiment, the time delay component 230 includes: 1) a transconductance amplifier 410, 2) an inverter 420, 3) a MOSFET switch 430, 4) a capacitance 440 and 5) a comparator 450. As described in FIG. 2, the time delay component 230 is placed between the pulse start component 210 and the logic component 240 to advantageously impose a time delay on the first output 214. The output of the time delay component 230 is the delayed first output 232.

The transconductance amplifier 410 acts as a programmable current source with the following equation: $I_{OUT}=(V_{R1}-V_{IN})*gm$, where $V_{R1}$ 412 represents a standard reference, and $I_{OUT}$ 414 the current output. In the depicted embodiment, $V_{IN}$ 416 is representative of the system power source (PWR_SRC) (not shown), e.g., AC adapter or battery. Generally $V_{IN}$ 416 is lower than $V_{R1}$ 412. When $V_{IN}$ 416 is at its minimum value (corresponding to a low voltage on PWR_SRC) $I_{out}$ 414 is at it's maximum. When $V_{IN}$ 416 is at it's maximum value (corresponding to a high voltage on PWR_SRC) $I_{out}$ 414 is at it's minimum. $I_{OUT}$ 414 charges the capacitor 440. A small value of the $I_{OUT}$ 414 charges the capacitor 440 at a slower rate than a larger value of the $I_{OUT}$ 414. When the voltage on the capacitor 440 goes above $V_{R2}$ 418 (another reference voltage) the output, which is the delayed first output 232 goes high. If $V_{IN}$ 416 is at it's minimum value and the first output 214 transitions from low to high the MOSFET 430 turns off and the capacitor 440 voltage starts charging from 0V. $I_{OUT}$ 414 will charge the capacitor 440 at it's maximum rate. This results in a minimum delay time between the first output 214 transitioning from low to high to the delayed first output 232 going low to high. In another scenario, when $V_{IN}$ 416 is at it's maximum value, this results in $I_{OUT}$ 414 being at it's minimum value further resulting in a maximum delay time between the first output 214 transitioning from low to high to the delayed first output 232 going low to high. When the first output 214 transitions low the MOSFET 430 turns on and the capacitor 440 is discharged at a rate independent of $I_{OUT}$ 414. Although this illustrative embodiment has been shown and described, a wide range of modification, change and substitution is contemplated. For example, the time delay component 230 may be implemented by other means such as programmable logic chips.

Figure 4B:
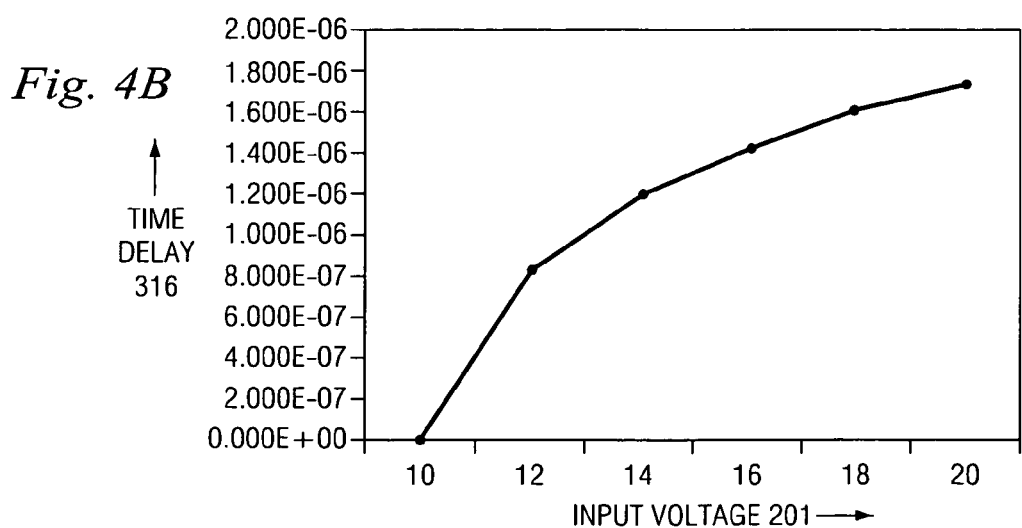
FIG. 4B illustrates a graphical relationship between the time delay $t_d$ 316 of FIG. 3B and the DC input voltage 201 of FIG. 2, according to one embodiment.

FIG. 4B illustrates a graphical relationship between the time delay $t_d$ 316 of FIG. 3B (shown on Y-axis) and the DC input voltage 201 of FIG. 2 (shown on X-axis), according to one embodiment. In the depicted embodiment, the time delay $t_d$ 316 is variable. A particular value of the time delay $t_d$ 316 is selectable responsive to the DC input voltage 201. That is, the graph defines the particular value required for the time delay $t_d$ 316 for a selected value of the DC input voltage 201. The particular value for the time delay $t_d$ 316 causes an adjustment of the $t_{OFF}$ 314 time period (not shown) to maintain a constant switching frequency of 68 KHz.

Figure 5:
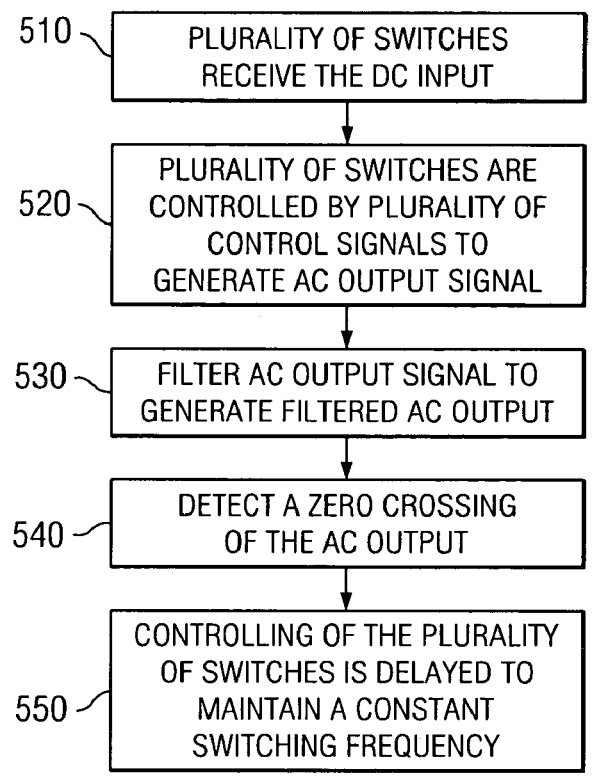
FIG. 5 is a flow chart illustrating a method for improving efficiency of an inverter, according to an embodiment.

FIG. 5 is a flow chart illustrating a method for improving efficiency of the inverter 200 providing power to the load 290, according to an embodiment. In step 510, the DC input 201 is received by the plurality of switches 250. In step 520, the plurality of switches 250 are controlled by the plurality of control signals 242 so as to generate the AC output across the terminals 252, in response to the DC input 201. In step 530, the output across the terminals 252 of the plurality of switches 250 is filtered by the filter component 260 to generate a filtered AC output to power the load 290. In step 540, a zero crossing of the AC output across the terminals 252 is detected by the pulse start component 210. In step 550, the controlling of the plurality of switches 250 is delayed by td 316 to effectively maintain a constant switching frequency of the inverter 200 in response to a change in the DC input 201.

Various steps described above may be added, omitted, combined, altered, or performed in different orders. For example, steps 540 and 550 may be performed before step 530 in one embodiment.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Figure 6:
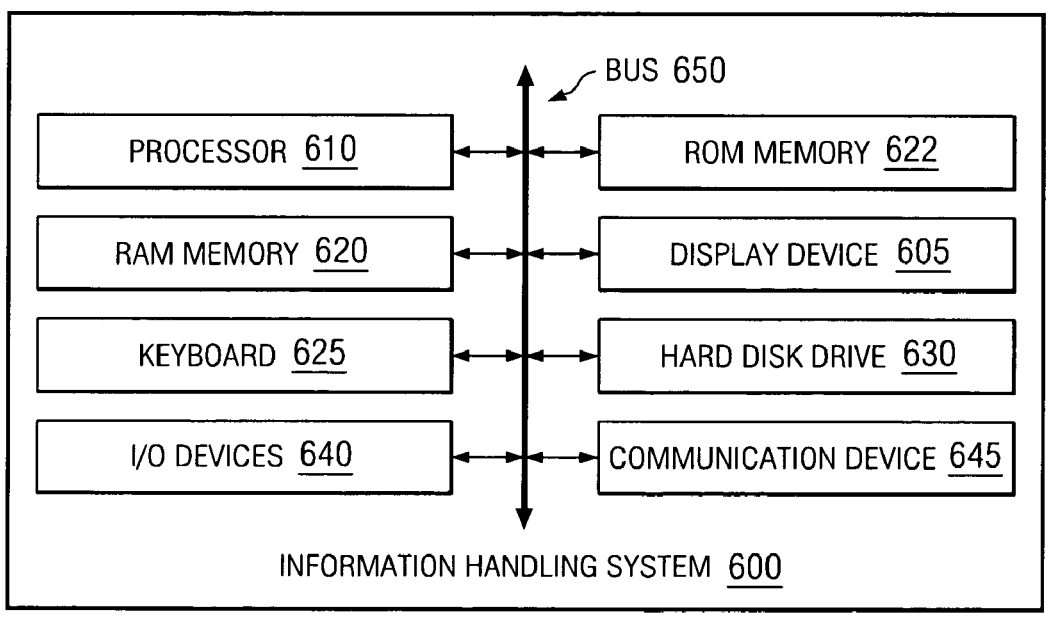
FIG. 6 illustrates a block diagram of an information handling system having an improved inverter, according to an embodiment.

FIG. 6 illustrates a block diagram of an information handling system 600 having an improved inverter, according to an embodiment. The information handling system 600 includes a processor 610, a system random access memory (RAM) 620 (also referred to as main memory), a non-volatile ROM 622 memory, a display device 605, a keyboard 625 and an I/O controller 640 for controlling various other input/output devices. It should be understood that the term "information handling system" is intended to encompass any device having a processor that executes instructions from a memory medium. The IHS 600 is shown to include a hard disk drive 630 connected to the processor 610 although some embodiments may not include the hard disk drive 630. The processor 610 communicates with the system components via a bus 650, which includes data, address and control lines. In one embodiment, the IHS 600 may include multiple instances of the bus 650. A communications controller 645, such as a network interface card, may be connected to the bus 650 to enable information exchange between the IHS 600 and other devices (not shown).

In one embodiment, a power supply system (not shown) providing power to the IHS 600 incorporates the inverter 200 (not shown) described in FIG. 2. In this embodiment, the display device 605 may include a CCFL representing the load 290. The inverter 200 (not shown) may be configured to provide power to the display device 605.

The processor 610 is operable to execute the computing instructions and/or operations of the IHS 600. The memory medium, e.g., RAM 620, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC).

Although illustrative embodiments have been shown and described, a wide range of modification, change and substitution is contemplated in the foregoing disclosure and in some instances, some features of the embodiments may be employed without a corresponding use of other features. For example, the frequency feedforward technique described herein may be applied to a pulse width feedforward control scheme as well. Also, while the frequency feedforward technique is advantageously applied to reduce power consumption in portable IHS, such a scheme may be applied to reduce the regulation requirements of an intermediate AC powered (or otherwise powered) DC stage as well. The technique may be used to remove the flicker effect from low frequency ripple on the preceding DC stage. For example, if there was a 60 Hz ripple on the DC, this technique may be used to reduce the impact on the LCD intensity. This advantageously leads to cost reductions in filter and/or control elements. Accordingly, it is appropriate that the appended claims be construed broadly and in a manner consistent with the scope of the embodiments disclosed herein.

What is claimed is:

1. A system comprising:
    means for receiving a direct current (DC) input;
    means for controlling a plurality of switches to generate an alternating current (AC) output in response to the DC input;
    a filtering component filtering the AC output to generate a filtered AC output to power the load;
    means for detecting a zero crossing of the AC output; and
    a time delay component delaying the controlling of the plurality of switches to effectively maintain a constant switching frequency of the inverter in response to a change in the DC input.

2. The system of claim 1, wherein the delaying is caused by setting a time delay, wherein the time delay has a variable time value.

3. The system of claim 2, wherein the time delay varies as a predefined function of the DC input, wherein the variable time value increases as the DC input increases.

4. The system of claim 1, wherein the controlling of the plurality of switches includes placing each switch in the plurality of switches to an ON or OFF state, and by adjusting a time period in the ON state.

5. The system of claim 4, wherein the delaying imposes a time delay measured from the zero crossing to a change in the ON or OFF state.

6. The system of claim 4, wherein the time delay causes an adjustment of the time period in the OFF state to maintain the constant switching frequency.

7. The system of claim 1, wherein imposing the time delay causes a subsequent zero crossing of the AC output to remain fixed relative to a previous zero crossing thereby generating the constant switching frequency.

8. The system of claim 7, wherein the subsequent zero crossing remaining fixed relative to the previous zero crossing generates the constant switching frequency.

9. The system of claim 1, wherein the load is a cold cathode fluorescent lamp (CCFL).

* * * * *